(12) United States Patent
de Andrade

(10) Patent No.: US 7,052,205 B2
(45) Date of Patent: May 30, 2006

(54) METHOD OF FORMING AN ARTIFICIAL REEF FOR SHAPING WAVES AND A METHOD FOR REMOVING AN ARTIFICIAL REEF

(76) Inventor: Mauricio Carvalho de Andrade, Avenida Presidente Wilson, No. 164, 13th Floor, Rio de Janerio (BR) CEP-20030-020

( * ) Notice: Subject to any disclaimer, the term of this patent is extended or adjusted under 35 U.S.C. 154(b) by 42 days.

(21) Appl. No.: 10/470,823

(22) PCT Filed: Jan. 29, 2002

(86) PCT No.: PCT/BR02/00012

§ 371 (c)(1), (2), (4) Date: Jan. 8, 2004

(87) PCT Pub. No.: WO02/061209

PCT Pub. Date: Aug. 8, 2002

(65) Prior Publication Data

US 2005/0100408 A1 May 12, 2005

(30) Foreign Application Priority Data

Jan. 30, 2001 (BR) .................................. 0100208

(51) Int. Cl.
*E02B 3/04* (2006.01)
(52) U.S. Cl. .......................... 405/23; 405/25; 119/221; 119/222
(58) Field of Classification Search ................. 405/23, 405/25, 26, 15, 21; 119/221, 222
See application file for complete search history.

(56) References Cited

U.S. PATENT DOCUMENTS 4,712,944 A * 12/1987 Rose ........................ 405/26
5,141,359 A 8/1992 Klockner
5,176,468 A * 1/1993 Poole ........................ 405/23
5,207,531 A 5/1993 Ross
6,102,616 A 8/2000 Foote
6,491,473 B1 * 12/2002 Veazey ...................... 405/23

FOREIGN PATENT DOCUMENTS

| FR | 2622224 | * | 4/1989 |
| NL | 278 599 A | | 11/1964 |
| NL | 8 005 158 A | | 4/1982 |
| WO | 99 57376 A | | 11/1999 |

OTHER PUBLICATIONS

International Search Report—PCT/BR02/00012; ISA/EPO, completed May 28, 2002.

* cited by examiner

*Primary Examiner*—Frederick L. Lagman
(74) *Attorney, Agent, or Firm*—Harness, Dickey & Pierce, P.L.C.

(57) ABSTRACT

A method of forming artificial reefs in which a set of blocks having internal cavities full of air are interconnected in the desired shape of the artificial reef. The blocks of the set float when full of air and the thus defined reef is towed to the location of use, at which time an air valve in the upper region of each block is opened, permitting the air to escape and sew water to enter the block through an opening in a lower region. In this way the set of blocks is sunk to a designated location on the sea bed adjacent a sandy beach, forming the desired reef. Depending on the configurations of the individual blocks and of the overall shape of the reef, the invention permits both the formation of waves suitable for water sports, such as surf, windsurf and the like, and also the making of an otherwise dangerous beach safe for bathers. The reefs formed in accordance with the methods of this invention may be removed by the simultaneous filling of the blocks with compressed air through the valves and respective openings, thus expelling the sea water from the interior of the blocks which will once more rise to the surface of the sea for towing to another location for dismounting or re-use.

21 Claims, 4 Drawing Sheets

METHOD OF FORMING AN ARTIFICIAL REEF FOR SHAPING WAVES AND A METHOD FOR REMOVING AN ARTIFICIAL REEF

FIELD OF THE INVENTION

The present invention relates to methods for forming and removing a reef for shaping the waves of the sea in the region of sandy beaches.

BACKGROUND OF THE INVENTION

There are various existing prior art concepts for forming artificial reefs, but the majority of them involve construction of high cost that require sub-soil foundations that are difficult to anchor and, even so, do not have the desired efficiency due to the force of the sea in rough conditions or in the presence of strong winds. The most advanced technology known to applicant is that of Australian Patent AU 711,579 (corresponding to U.S. Pat. No. 5,913,636) which precisely exemplifies these problems in its application and use since, notwithstanding elevated costs of construction, the reefs have been difficult to fix to the sea bed and further have suffered displacement in the presence of stronger currents, without providing the required barrier or consolidation for a given period of time necessary for a sporting event or the like, and certainly not for indeterminate periods.

A practical example of the use of prior art techniques is an engineering work constructed on the Australian Gold Coast, using sacks of sand, that resulted in considerable problems related to labour and installation equipment, apart from unforeseen technical and environmental difficulties such as winds, rough seas and the like.

The principal object of the present invention is to provide a method of forming a temporary or permanent artificial reef adjacent to sandy beaches with a view to the practice of water sports, to reduce the effects and dangers of "tumble beaches" and the like. It is an object of the present invention to permit, at reduced cost and with relative simplicity, to form an artificial reef that, depending on the specific type of structural elements used, results in the formation of waves that are perfectly adequate for the desired purpose, that is to say, waves for surf, calm waves for improving bathing conditions by the beach or others, such as the dissipation of the energy of the waves by making them break further out to ensure stability in regions where oil lines, gas lines, communication lines or port installations pass or where it is desired to divert unfavourable currents or stabilise stretches of coast that have been degraded by badly planned works or by the effects of nature In another aspect, the invention, refers to the simple removal of the artificial reef for dismounting or use in another location.

SUMMARY OF THE INVENTION

According to the present invention a method for forming an artificial reef for shaping the waves of the sea in which blocks are placed on the sea bed, comprises the steps of:

providing a set of concrete blocks, each said block having an internal cavity of volume sufficient to permit the block to float, at least one entry opening with a valve for the passage of air, in an upper region of the block, and at least one opening for the passage of sea water, in a lower region of the block;

arranging the set of blocks in interconnected relationship, with said valves closed, on the surface of the sea, in suitable positions and arrangements above the location on the sea bed designated for receiving the artificial reef; and opening the valves in said blocks to permit the sea water to enter the blocks in a controlled manner through their said openings for the passage of sea water, with the air being expelled through their said openings for air, whereby said set of blocks sinks to the sea bed, at said designated location, so as to form said artificial reef.

It will immediately be seen that the elements necessary for carrying out the invention are of extreme simplicity. They comprise blocks made of cement or the like that float and have means that permit them to sink to the sea bed due to the entry of water into their internal cavities. The blocks will already be interconnected to predefine the configuration of the reef to be formed at the sea bed, it only being necessary to sink them together. The set of blocks with their interconnections may be prepared in another location where conditions are more suitable and then towed to the desired location to be sunk.

Preferably, the blocks are interconnected by connection elements between adjacent blocks, which may include ties. Apart from this, the maneuverability of the set of blocks may be improved by using rows of tires between adjacent blocks.

The shape or configuration of the reef will depend on the configuration of the set of blocks which may, for example, define an arrow shaped structure. In such a case, the ends of the set may be interconnected by a steel cable to maintain the arrow shape.

According to another aspect of the invention, a method for removing an artificial reef formed in the above manner comprises the steps of:

Introducing compressed air into the air openings in the blocks, thus expelling the sea water through their sea water openings so that the blocks float once more; and towing the set of interconnected blocks to another location.

BRIEF DESCRIPTION OF THE DRAWINGS

The invention will be better understood from the following detailed description, given by way of example, with reference to the drawings, in which.

DETAILED DESCRIPTION OF THE PREFERRED EMBODIMENTS

Figure 1:
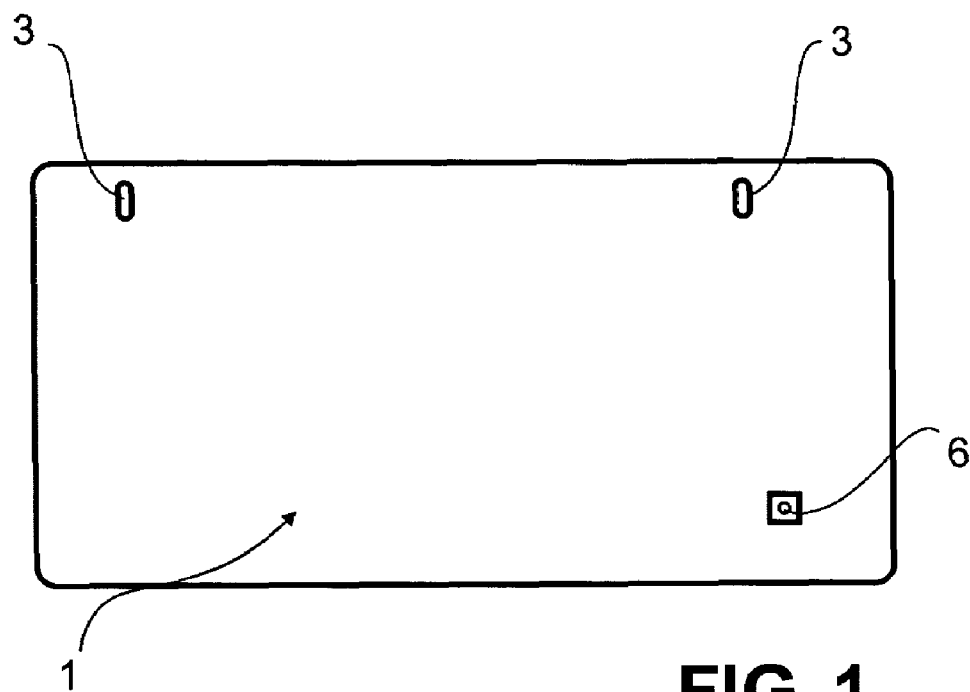
FIG. 1 is an upper plan view of a concrete block suitable for use in carrying out the method of the present invention.
Figure 2:
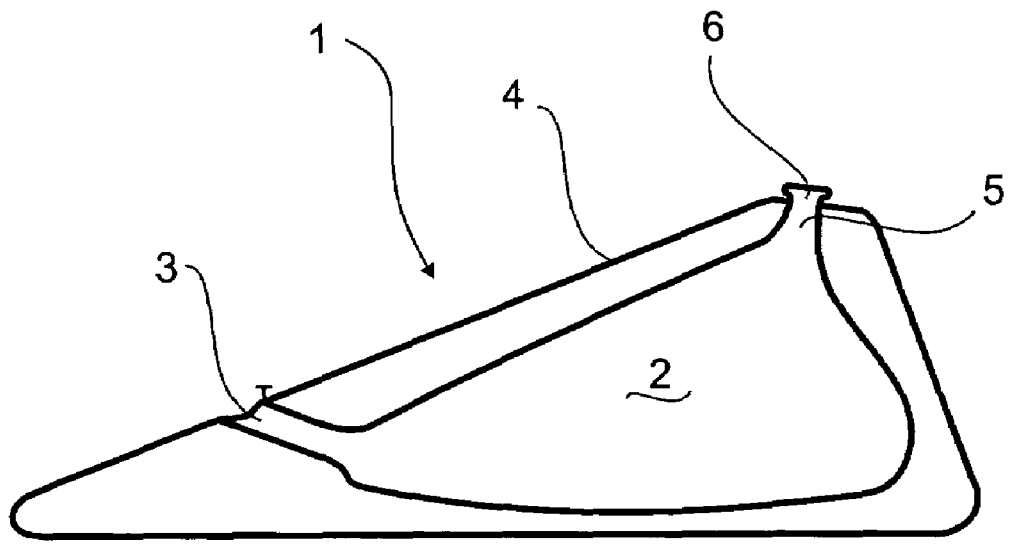
FIG. 2 is a vertical section through the block, along line A—A of FIG. 1.

FIGS. 1 and 2 show a block of premolded concrete 1 with an internal cavity 2 of sufficient dimensions to ensure that the block will float at the surface of the sea, when full of air.

Block 1 has an triangular outer shape, with a flat bottom. The inner cavity 2 within block 1 is in communication with the exterior by means of two openings 3 for the passage of sea water. These openings 3 are situated on the upper inclined face 4 of the block, in the proximities of its lowest point.

Block 1 also has an opening 5 for the entry and exit of air, formed in face 4 of the block, in the proximity of its uppermost point. The opening 5 has a valve 6 so that, when closed, the air contained in cavity 2 cannot escape and consequently the sea water cannot enter the cavity through openings 3. Block 1 will therefore float.

Figure 3:
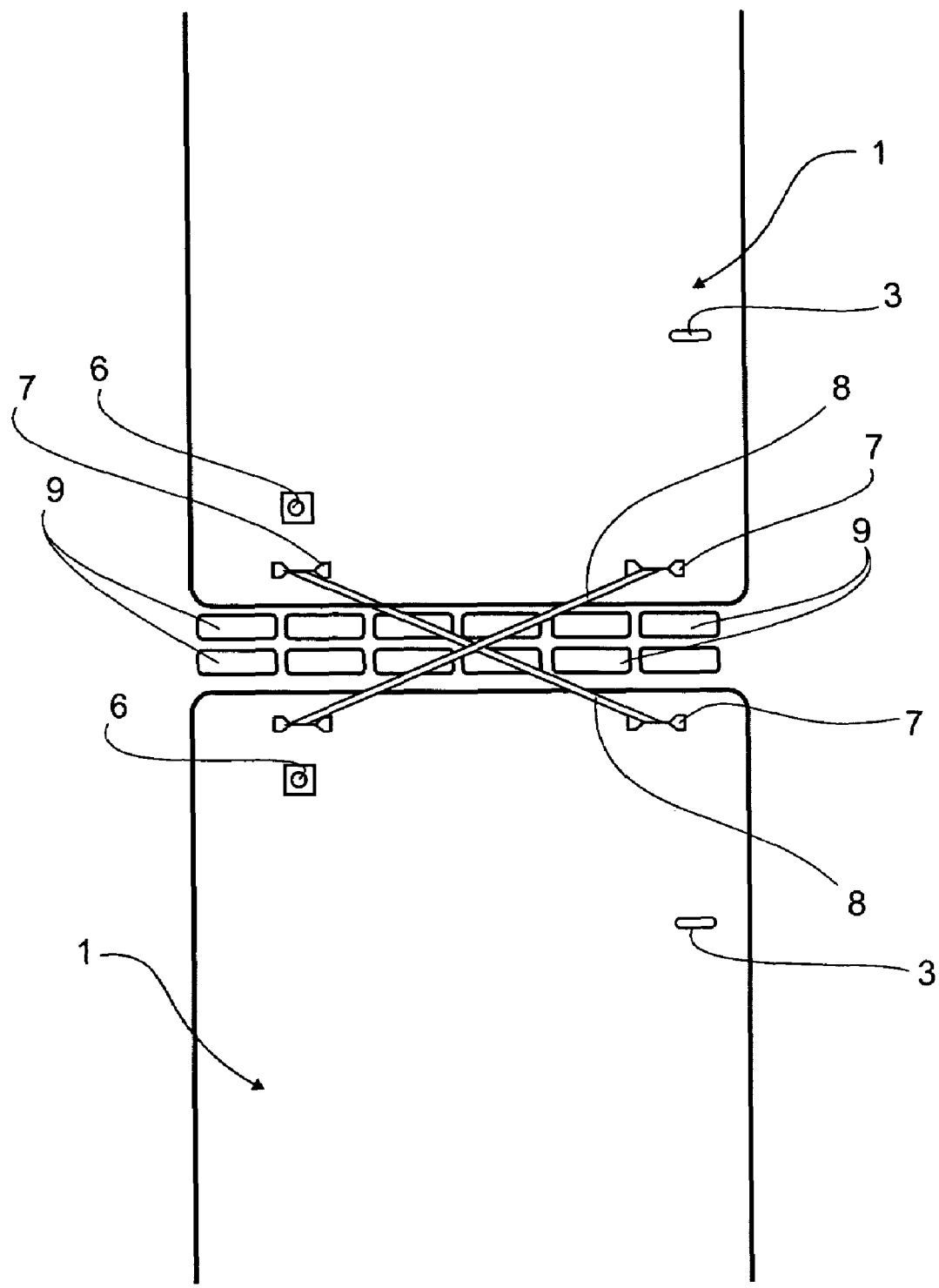
FIG. 3 shows, in an upper plan view, part of two blocks of a set of blocks for use in carrying out the method of this invention, showing the interconnection between the blocks.

FIG. 3 is a partial view of a set of interconnected blocks 1, showing the interconnections. It will be seen that each of blocks 1 has two fixing tabs 7, each tab of one block being connected to a fixing tab of another block by means of a tie rod 8, the ties forming an "X".

With a view to making the configuration of the set of blocks 1 structurally firmer and, furthermore, to facilitate towing to the location where the set will be sunk to create the artificial reef, one or two lines of tires 9 may be arranged between each pair of blocks 1.

Figure 4:
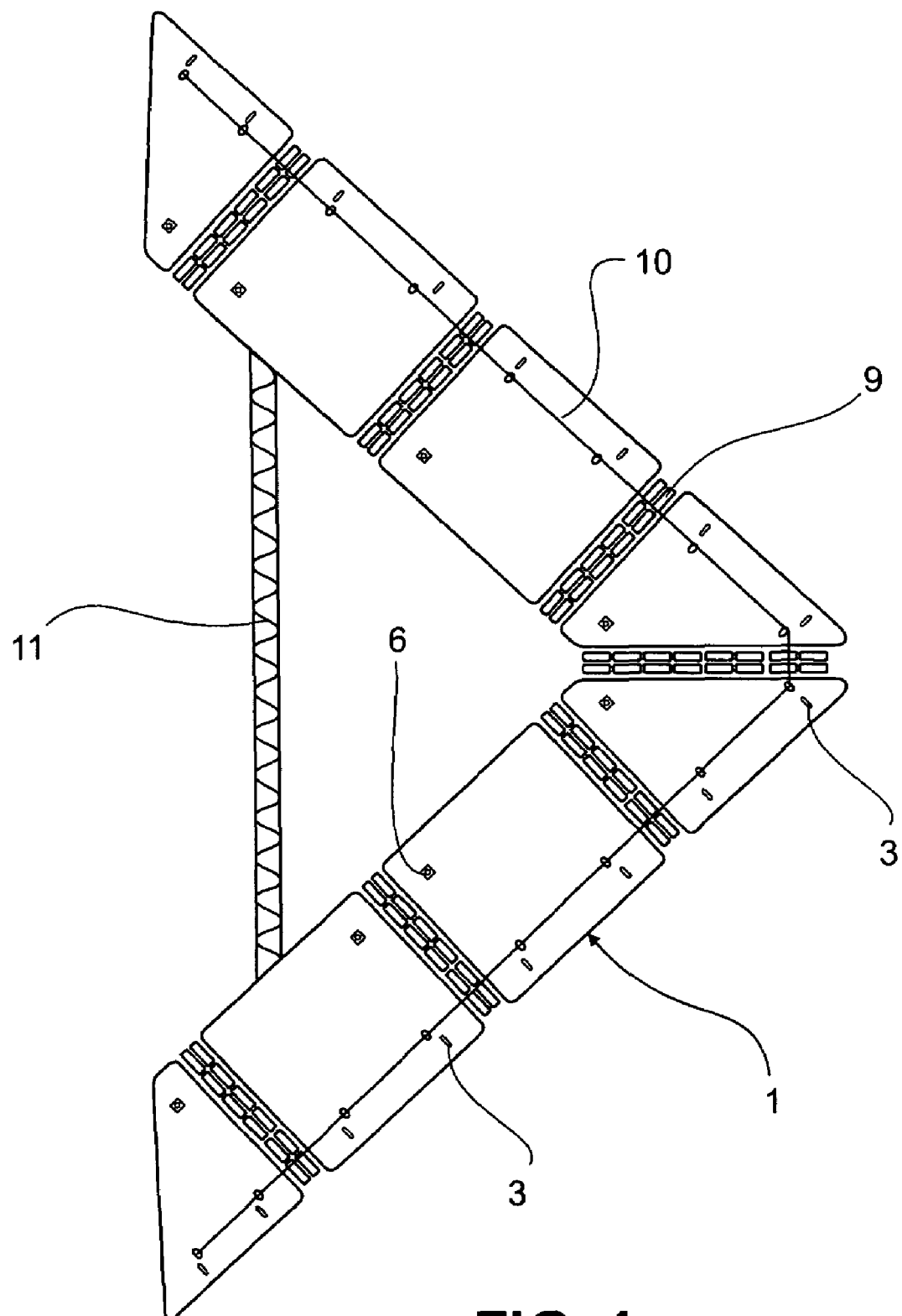
FIG. 4 shows, in an upper plan view, a set of blocks already in a desired triangular configuration for a given artificial reef, prior to being sunk during the process of the present invention.

FIG. 4 shows an example of a set of eight blocks 1 for forming an artificial reef in the shape of an arrowhead, when seen from above. It is observed obviously that the blocks need not all be identical, the basic block shape being triangular, as seen in FIG. 2, but the profile depending on the configuration of the set. This will be clear from FIG. 3. FIG. 4 also shows that the structural firmness of the set of blocks 1, in arrowhead configuration, may be further improved by connecting blocks 1 with steel cables 10 and/or by the ends of the set being directly interconnected by a "scissor" 11.

Taking the set of blocks 1 shown in FIG. 4 as an example, the blocks are first connected to each other to create the structure of FIG. 4 and the structure is then towed to the location where it is desired to form the reef. Once at the location, and using specialized manpower, the valves 6 in the various blocks are opened in a controlled manner to permit air to escape through openings 5 and the resulting entry of sea water through openings 3 in each block. In this manner the structure will sink until it seats itself on the sand at the bottom of the sea, with the complete weight of the concrete.

Should there be a desire to remove the artificial reef so formed, it will be sufficient to fill the blocks 1 with compressed air through the valves 6 in their respective openings 5, thus forcibly expelling the seawater from the interior of cavity 2, through openings 3. The structure once more will rise to the surface and may then be towed to another location for dismounting.

Figure 5:
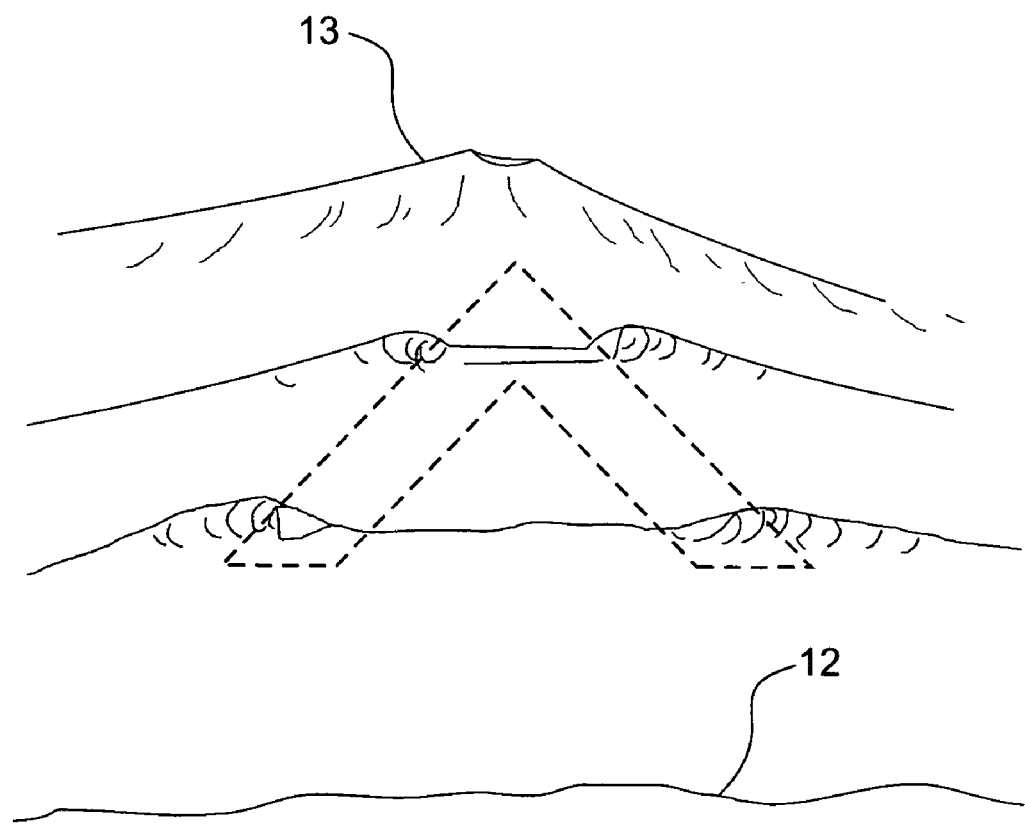
FIG. 5 is a showing (top view) of a sandy beach with the reef of FIG. 4 already sunk, showing the effect of the latter on sea movement.

FIG. 5 is illustrative of the effect of the artificial reef of FIG. 4 on the movement of the sea and on the consequent formation of the waves. As will be understood from the figure, an arrow-shaped artificial reef will make the the waves 13 break along the extension of the blocks in a manner that is predetermined by their shape, permitting the practice of water sports, such as surfing, windsurfing, kite surfing and the like. When the reef is installed in locations with considerable tide movements, complementary components may be adapted onto the surfaces of the blocks to increase their height and thus attenuate any undesirable effects that the tides may have.

As has already been mentioned, the effect of an artificial reef formed in accordance with then method of this invention will depend both on the configuration of the set of blocks 1 (an arrowhead in the illustrated embodiment) and on the variation of the upper surface of the blocks. For example, although it is a main object of the invention to make sandy beached suitable for the practice of water sports, an artificial reef may be formed so as to attenuate the violent effects of the waves on so-called "tumble beaches" that are open to the ocean without any natural protection, making such beaches suitable for bathing without risk to bathers, due to the fact that the waves can be made to break further out and thus reach the beach line 12 with reduced force (see FIG. 5).

The method of the present invention, which uses blocks having controlled floatability, comprises an easy and efficient manner of adapting or installing artificial reefs on sandy beaches, at a low cost, without the necessity for costly preliminary studies and with easy removal when desired.

I claim:

1. A method for forming an artificial reef for shaping the waves of the sea in which blocks are placed on the sea bed, comprising the steps of:

providing a set of at least two blocks, each of the blocks having an internal cavity of sufficient volume to permit the block to float, at least one entry opening with a valve for the passage of air, in an upper region of the block, and at least one opening for the passage of sea water, in a lower region of the block;

arranging the set of blocks in an interconnected relationship such that the set of blocks defines a structure in the configuration of an arrowhead, with the valves closed, on a surface of the sea, in suitable positions and arrangements above a location on the sea bed designated for receiving the artificial reef; and opening the valves in the blocks to permit the sea water to enter the blocks in a controlled manner through the openings for the passage of sea water, with the air being expelled through the openings for air, wherein the set of blocks sinks to the sea bed, at the designated location, to form the artificial reef.

2. The method according to claim 1, wherein the step of arranging the set of blocks on the surface of the sea above the designated location on the sea bed further comprises forming the floating set of blocks at a first location on the surface of the sea and then towing the set of blocks to another location on the surface of the sea above the designated location.

3. The method according to claim 1, wherein the interconnected relationship of the set of blocks includes the placement of ties between the blocks.

4. The method according to claim 3, wherein the ties comprise tie rods interconnecting adjacent blocks.

5. The method according to claim 3, wherein the ties include a steel cable interconnecting all the blocks.

6. The method according to claim 3, wherein the blocks are separated from each other by rows of tires.

7. The method according to claim 1, wherein ends of the set of blocks are interconnected by an element appropriate to maintain the arrowhead configuration.

8. The method according to claim 1, wherein the blocks are formed of concrete.

9. The method according to claim 1, wherein the blocks are separated from each other by rows of tires, the ties include a steel cable interconnecting all the blocks; and the ends of the set of blocks are interconnected by an element appropriate to maintain the arrowhead configuration.

10. A method for removing an artificial reef formed according to the method of claim 1, comprising the steps of:

introducing compressed air into the air openings in the blocks, expelling the sea water through the sea water openings so that the blocks float; and towing the set of interconnected blocks to another location.

11. An artificial reef formed according to the method of claim 1.

12. A method for forming an artificial reef comprising:
providing a plurality of blocks having an interior cavity;
directly connecting the plurality of blocks to each other with ties to form a set of interconnected blocks in an arrowhead configuration, the interconnected blocks being separated from each other by a plurality of tires;
towing the interconnected blocks to a reef-formation location;
filling the interior cavity of each of the blocks with sea water; and
sinking the interconnected blocks to a bottom of the sea at the reef-formation location to form the artificial reef.

13. The method for forming an artificial reef according to claim 12, wherein a shape of the blocks is triangular.

14. The method for forming an artificial reef according to claim 12, wherein the ties comprise steel cables.

15. The method for forming an artificial reef according to claim 12, wherein each of the blocks includes a plurality of openings for the entry and exit of either seawater or air.

16. An artificial reef comprising:
a plurality of triangular-shaped blocks interconnected to each other in an arrowhead configuration, each of the blocks comprising:
an inner cavity;
a plurality of openings for the passage of sea water and air into and out of the cavity, at least one of the openings being controlled by a valve;
a plurality of fixing tabs for directly connecting each of the blocks together with tie rods; and
a plurality of tires arranged between each of the blocks.

17. The artificial reef according to claim 16, wherein an opening for the entry and exit of air is formed in a face of the triangular-shaped block at an uppermost point of the face; and
an opening for the passage of sea water is formed in the face of the triangular-shaped block at a lowest point of the face.

18. The artificial reef according to claim 17, wherein the plurality of blocks is towable.

19. A method for forming an artificial reef for shaping the waves of the sea in which blocks are placed on the sea bed, comprising the steps of:
providing a set of more than two blocks, each of the blocks having an internal cavity of sufficient volume to permit the block to float, at least one entry opening with a valve for the passage of air, in an upper region of the block, and at least one opening for the passage of sea water, in a lower region of the block;
arranging the set of blocks in an interconnected relationship in an arrowhead configuration, with the valves closed, on a surface of the sea, in suitable positions and arrangements above a location on the sea bed designated for receiving the artificial reef; and
opening the valves in the blocks to permit the sea water to enter the blocks in a controlled manner through the openings for the passage of sea water, with the air being expelled through the openings for air, wherein the set of blocks sinks to the sea bed, at the designated location, to form the artificial reef.

20. The method according to claim 19, wherein ends of the set of blocks are interconnected by an element appropriate to maintain the arrowhead configuration.

21. A method for forming an artificial reef for shaping the waves of the sea in which blocks are placed on the sea bed, comprising the steps of:
providing a set of more than two blocks, each of the blocks having an internal cavity of sufficient volume to permit the block to float, at least one entry opening with a valve for the passage of air, in an upper region of the block, and at least one opening for the passage of sea water, in a lower region of the block;
arranging the set of blocks in an interconnected relationship in an arrowhead configuration, with the valves closed, on a surface of the sea, in suitable positions and arrangements above a location on the sea bed designated for receiving the artificial reef, said blocks being separated from each other by rows of tires, all of said blocks being interconnected by a steel cable and the ends of said set of blocks being interconnected by an element appropriate to maintain the arrowhead configuration; and
opening the valves in the blocks to permit the sea water to enter the blocks in a controlled manner through the openings for the passage of sea water, with the air being expelled through the openings for air, wherein the set of blocks sinks to the sea bed, at the designated location, to form the artificial reef.

* * * * *